United States Patent
Choi (10) Patent No.: US 7,893,955 B2
(45) Date of Patent: Feb. 22, 2011

(54) APPARATUS AND METHOD FOR DISPLAYING IMAGE DATA DIRECTION OF TERMINAL

(75) Inventor: Cha-Bong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/996,713

(22) Filed: Nov. 30, 2001

(65) Prior Publication Data

US 2002/0080103 A1 Jun. 27, 2002

(30) Foreign Application Priority Data

Dec. 23, 2000 (KR) ............. 10-2000-0081153

(51) Int. Cl.
*H04N 7/18* (2006.01)
(52) U.S. Cl. .................................. 348/61; 348/135
(58) Field of Classification Search ............ 348/116, 348/169, 113, 423.1, 425.1, 143; 340/990; 375/240.26
See application file for complete search history.

(56) References Cited

U.S. PATENT DOCUMENTS

| | | | | |
|---|---|---|---|---|
| 5,335,072 A * | 8/1994 | Tanaka et al. | ............ | 348/231.3 |
| 5,579,535 A * | 11/1996 | Orlen et al. | ............ | 455/421 |
| 5,672,820 A * | 9/1997 | Rossi et al. | ............ | 73/178 R |
| 5,892,855 A * | 4/1999 | Kakinami et al. | ............ | 382/291 |
| 5,900,909 A * | 5/1999 | Parulski et al. | ............ | 348/231.6 |
| 6,084,630 A * | 7/2000 | Yamagishi et al. | ............ | 348/220.1 |
| 6,133,947 A * | 10/2000 | Mikuni | ............ | 348/143 |
| 6,236,940 B1 * | 5/2001 | Rudow et al. | ............ | 701/300 |
| 6,282,362 B1 * | 8/2001 | Murphy et al. | ............ | 386/46 |
| 6,292,215 B1 * | 9/2001 | Vincent | ............ | 348/169 |
| 6,359,571 B1 * | 3/2002 | Endo et al. | ............ | 340/988 |
| 6,449,011 B1 * | 9/2002 | Muramatsu et al. | ............ | 348/169 |
| 6,507,371 B1 * | 1/2003 | Hashimoto et al. | ............ | 348/552 |
| 6,516,094 B1 * | 2/2003 | Takahashi et al. | ............ | 382/243 |
| 6,535,243 B1 * | 3/2003 | Tullis | ............ | 348/207.1 |
| 6,542,824 B1 * | 4/2003 | Berstis | ............ | 701/220 |
| 6,992,699 B1 * | 1/2006 | Vance et al. | ............ | 348/207.99 |
| 2001/0041586 A1 * | 11/2001 | Irube et al. | ............ | 455/556 |

* cited by examiner

*Primary Examiner*—David Czekaj
(74) *Attorney, Agent, or Firm*—KED & Associates, LLP (57) ABSTRACT

An apparatus and method for displaying image data direction of a terminal displays direction information in case of displaying an object photographed through a camera installed in a terminal thus to maximize efficiency value of image information and utilize a multiplexing format including direction in an image as a basis data format. To achieve the purpose of the present invention, there is provided an apparatus for displaying image data direction of a terminal in accordance with the present invention comprising a direction sensor for detecting direction of a photographing object in a conventional terminal and a direction displaying apparatus for encoding and packetizing the converted digital direction signal. There is also provided a method for displaying image data direction of a terminal in accordance with the present invention comprising the steps of receiving an image frame from a base station, demultiplexing the received image frame in a multiplexing processing unit and separating the frame into voice, image and direction data and displaying the separated direction and image data on an LCD according to control of the direction displaying processing unit.

28 Claims, 10 Drawing Sheets

| | <FIRST BITE> | | | | | | | | <SECOND BITE> DEGREE OF ANGLE (0~90 DEGREES) | | | | | | | |
|---|---|---|---|---|---|---|---|---|---|---|---|---|---|---|---|---|
| | N | E | W | S | | | | | | | | | | | | |
| DISPLAY EXAMPLE | 0 | 0 | 0 | 0 | 0 | 0 | 0 | 0 | 0 | 0 | 0 | 0 | 0 | 0 | 0 | 0 |
| NE 15° | 1 | 1 | 0 | 0 | 0 | 0 | 0 | 0 | 0 | 0 | 0 | 0 | 1 | 1 | 1 | 1 |
| N | 1 | 0 | 0 | 0 | 0 | 0 | 0 | 0 | 0 | 0 | 0 | 0 | 0 | 0 | 0 | 0 |
| NW 5° | 1 | 0 | 1 | 0 | 0 | 0 | 0 | 0 | 0 | 0 | 0 | 0 | 1 | 1 | 1 | 1 |
| SE 45° | 0 | 1 | 0 | 1 | 0 | 0 | 0 | 0 | 0 | 0 | 1 | 0 | 1 | 1 | 1 | 1 |

| N | NE 15° | E |   NORTHERN-EAST 15°
| W | N | E |   DIRECT NORTH
| W | NW 15° | N |   NORTHERN-WEST 15°
| E | SE 45° | S |   SOUTHERN-EAST 45°

APPARATUS AND METHOD FOR DISPLAYING IMAGE DATA DIRECTION OF TERMINAL

BACKGROUND OF THE INVENTION

1. Field of the Invention

The present invention relates to a terminal and particularly, to an apparatus and method for displaying image data direction of a terminal, which can display direction together in photographing an object through a camera installed in a terminal.

2. Description of the Background Art

Figure 1:
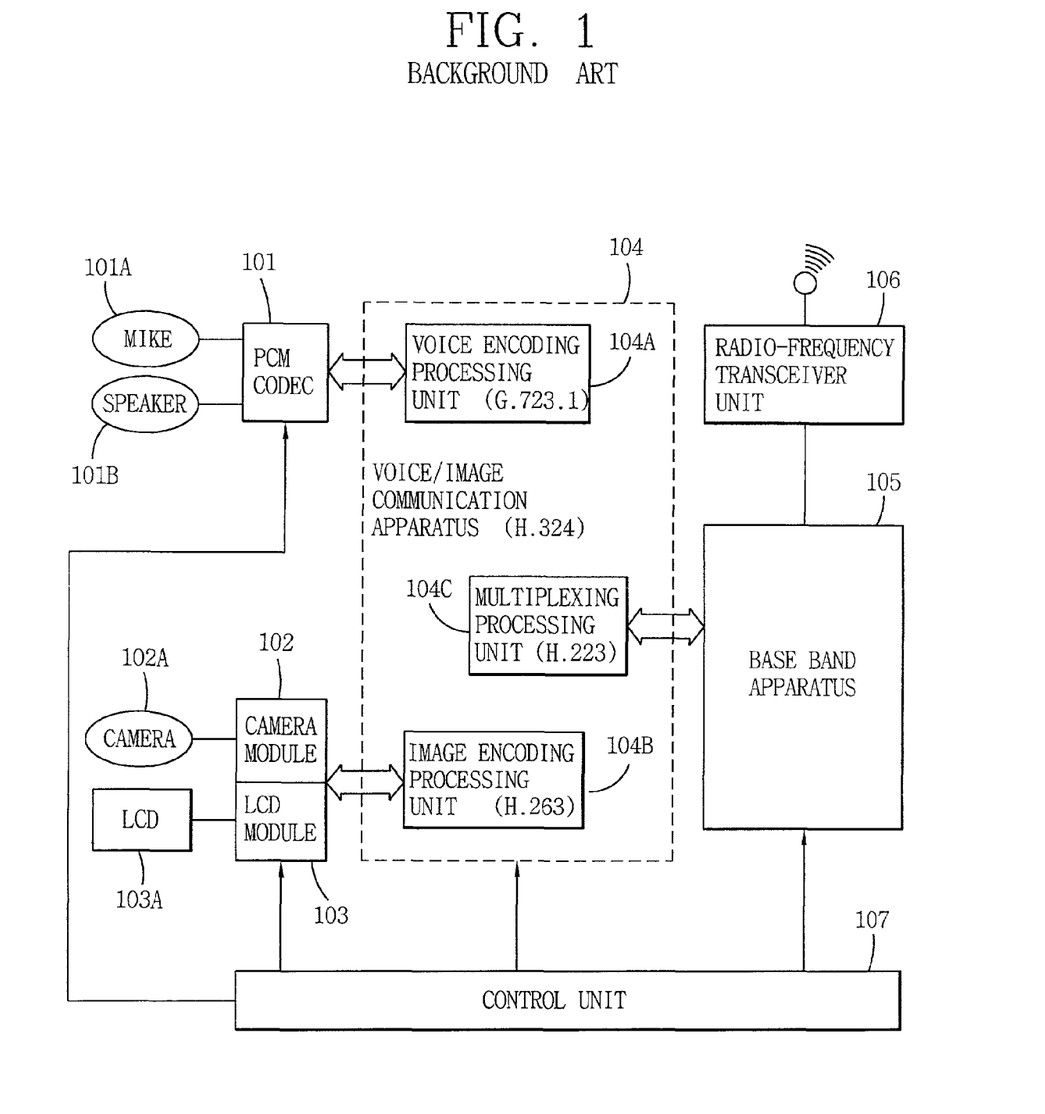
FIG. 1 is a block diagram of a conventional terminal.

FIG. 1 is a block diagram of a conventional terminal.

As shown in FIG. 1, a conventional terminal comprises a Pulse Code Modulation Codec (PCM) codec 101 for converting an analogue voice signal to a digital voice signal or converting reversely, a mike 101A for generating the analogue voice signal and transmitting the signal into the PCM codec 101, a speaker 101B for regenerating the analogue voice signal outputted from the PCM codec 101, a camera 102A for generating an analogue image signal, a camera module 102 for converting the analogue signal outputted from the camera 102A into a digital image signal, an LCD module 103 for converting the digital image signal into an analogue image signal, an Liquid Crystal Display (LCD) 103A for displaying the analogue image signal outputted from the LCD module 103, a voice/image communication apparatus 104 for encoding and multiplexing the voice/image signal, a base band apparatus 105 and radio-frequency transceiver unit 106 for transmitting data encoded and multiplexed in the voice/image communication apparatus 104 and a control unit for controlling operation of each unit generally. The voice/image communication apparatus 104 comprises a voice encoding processing unit 104A for encoding and packetizing the digital voice signal, an image encoding processing unit 104B for encoding and packetizing the digital image signal and a multiplexing processing unit 104C for multiplexing the encoded and packetized voice/image signal.

The conventional terminal with the above composition will be described with reference to FIGS. 1, 2A and 2B.

Figure 2A:
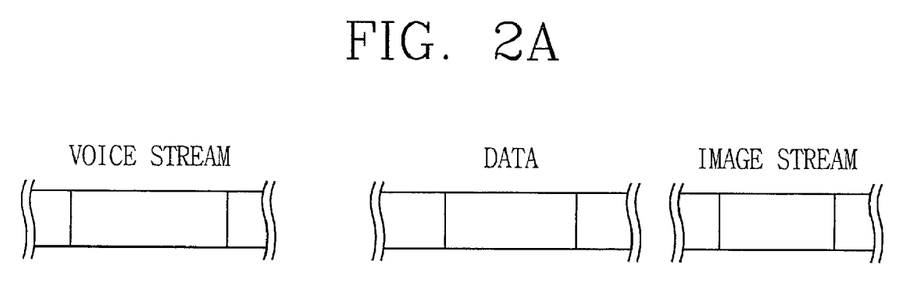
FIGS. 2A and 2B are format views illustrating multiplexing by multiplexing processing unit of FIG. 1.

The PCM codec 101 converts a analogue signal into a digital voice signal and the voice encoding processing unit 104A in the voice/image communication apparatus 104 encodes the digital voice signal and converts the encoded signal to a form of a packetized voice stream as in FIG. 2A. Namely, the voice encoding processing unit 104A performs encoding processing to transmit the voice data at real time and this is embodied by recommendation G.723.1F of ITU-T.

The camera module 102 converts an analogue image signal into a digital image signal and the image encoding processing unit 104B in the voice/image communication apparatus 104 encodes the digital image signal and converts the encoded signal to a form of a packetized image stream as in FIG. 2A Namely, the image encoding processing unit 104B performs encoding processing to transmit the image data at real time and this is embodied by recommendation H.263 of ITU-T.

Figure 2B:
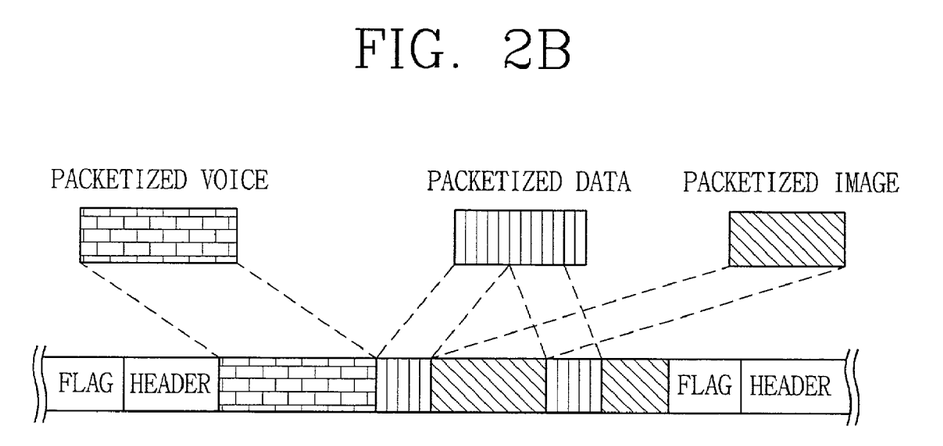

Also, the multiplexing processing unit 104C in the voice/image communication apparatus 104 multiplexes the packetized voice and image stream together with another necessary information and outputs multiplexing data in the form as in FIG. 2B. Therefore, the multiplexing data are transmitted to a radio-frequency transceiver unit 106 through a base band apparatus 105 and transmitted to the base station (not shown) wirelessly. On the other hand, the multiplexing data received in the radio-frequency transceiver unit 106 is detected by the base band apparatus 105, processed reversely by the voice/image communication apparatus 104 and outputted to the speaker 101B or LCD 103A. That is to say, the multiplexing processing unit 104C in the voice/image communication apparatus 104 performs demultiplexing operation and the voice encoding processing unit 104A and the image encoding processing unit 104B perform decoding operation. Namely, data demultiplexed by the multiplexing processing unit 104C are separated into voice stream, data and image streams respectively and the voice stream is decoded by the voice encoding processing unit 104A to the original digital data. The decoded digital data are converted to a voice signal by the PCM codec 101 and regenerated by the speaker 101B. Also, the separated image stream is decoded by the image encoding processing unit 104B and restored to the original digital data and the restored digital data is converted to an analogue image signal by the LCD module 103 and displayed on the LCD 103A.

However, since the conventional terminal displays only image signals simply, the terminal couldn't maximize usability of image information. For example, in case of receiving image data of a house to buy a new house, in the image signal, since the direction information is not included in the image positioning direction of respective rooms and windows can not be known and to get to know the direction, there was a disadvantage that a telephone or another means is needed.

SUMMARY OF THE INVENTION

Therefore, an object of the present invention is to provide an apparatus and method for displaying image data direction of a terminal which can display direction information in case of displaying an object photographed through a camera installed in a terminal.

To achieve these and other advantages and in accordance with the purpose of the present invention, as embodied and broadly described herein, there is provided an apparatus for displaying image data direction of a terminal in accordance with the present invention comprising a direction sensor for detecting direction of a photographing object in a conventional terminal and a direction displaying apparatus for encoding and packetizing the converted digital direction signal.

There is also provided a method for displaying image data direction of a terminal in accordance with the present invention comprising the steps of receiving an image frame from a base station, demultiplexing the received image frame in a multiplexing processing unit and separating the frame into voice, image and direction data and displaying the separated direction and image data on an LCD according to control of the direction displaying processing unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
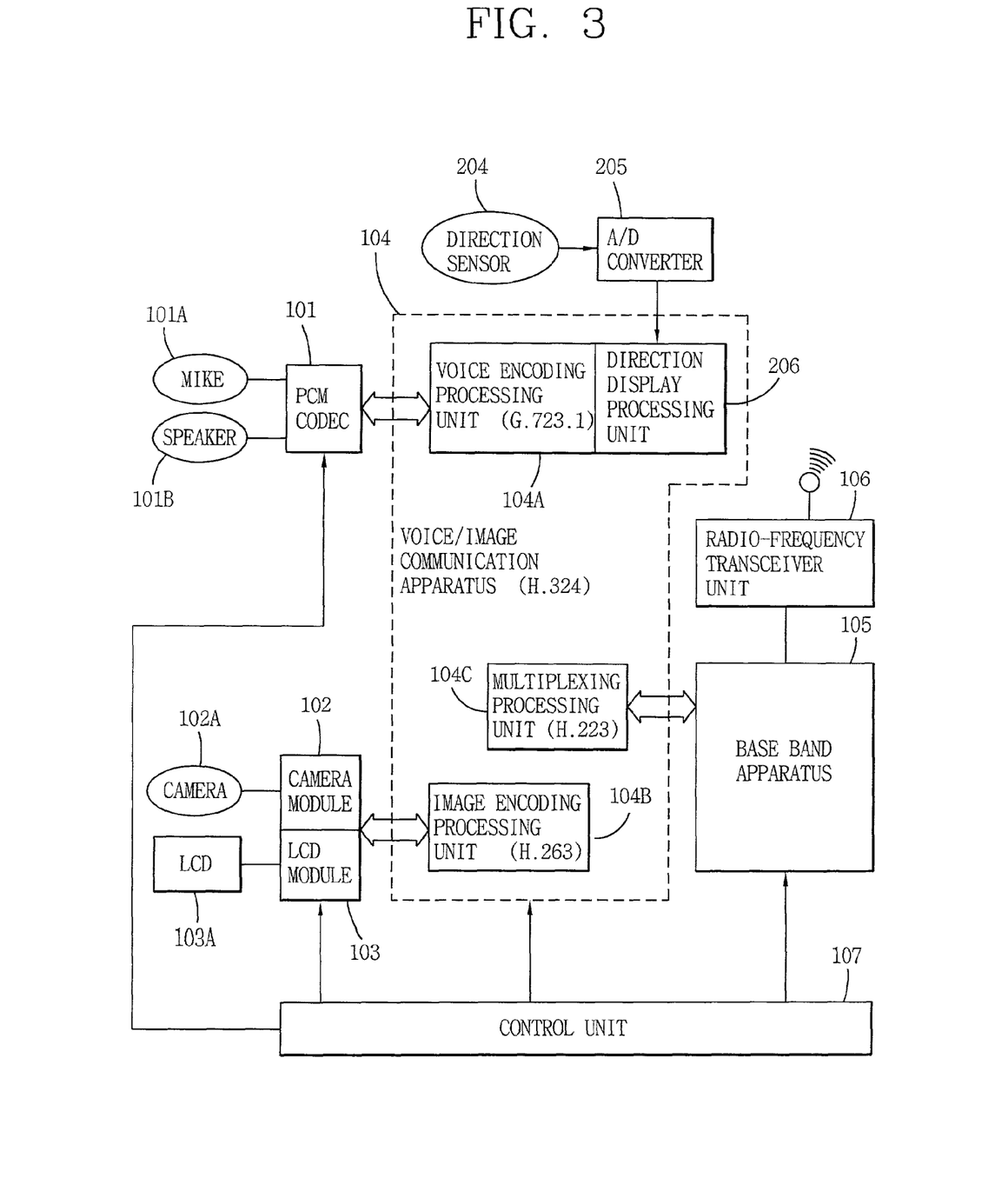
FIG. 3 is a block diagram showing a terminal in accordance with the present invention.

FIG. 3 is a block diagram showing a terminal in accordance with the present invention.

As shown in FIG. 3, the apparatus for displaying image data direction of the terminal in accordance with the present invention further adds a direction sensor 204 for detecting direction of a photographing object in a conventional terminal, an A/D converter 205 for converting the analogue direction signal detected by the direction sensor into a digital direction signal and a direction displaying processing unit 206 for encoding and packetizing the converted digital direction signal to FIG. 1. At this time, reference numerals same as the conventional were designated same portions.

The operation of the apparatus for displaying image data direction of the terminal in accordance with the present invention will be described in detail with reference to accompanied drawings.

In the apparatus for displaying image data direction of the terminal in accordance with the present invention, since the step of voice encoding processing process for encoding and packetizing a digital voice signal and the step of image encoding processing process for encoding and packetizing a digital voice signal are same as in the conventional art, the description is omitted.

Figure 4:
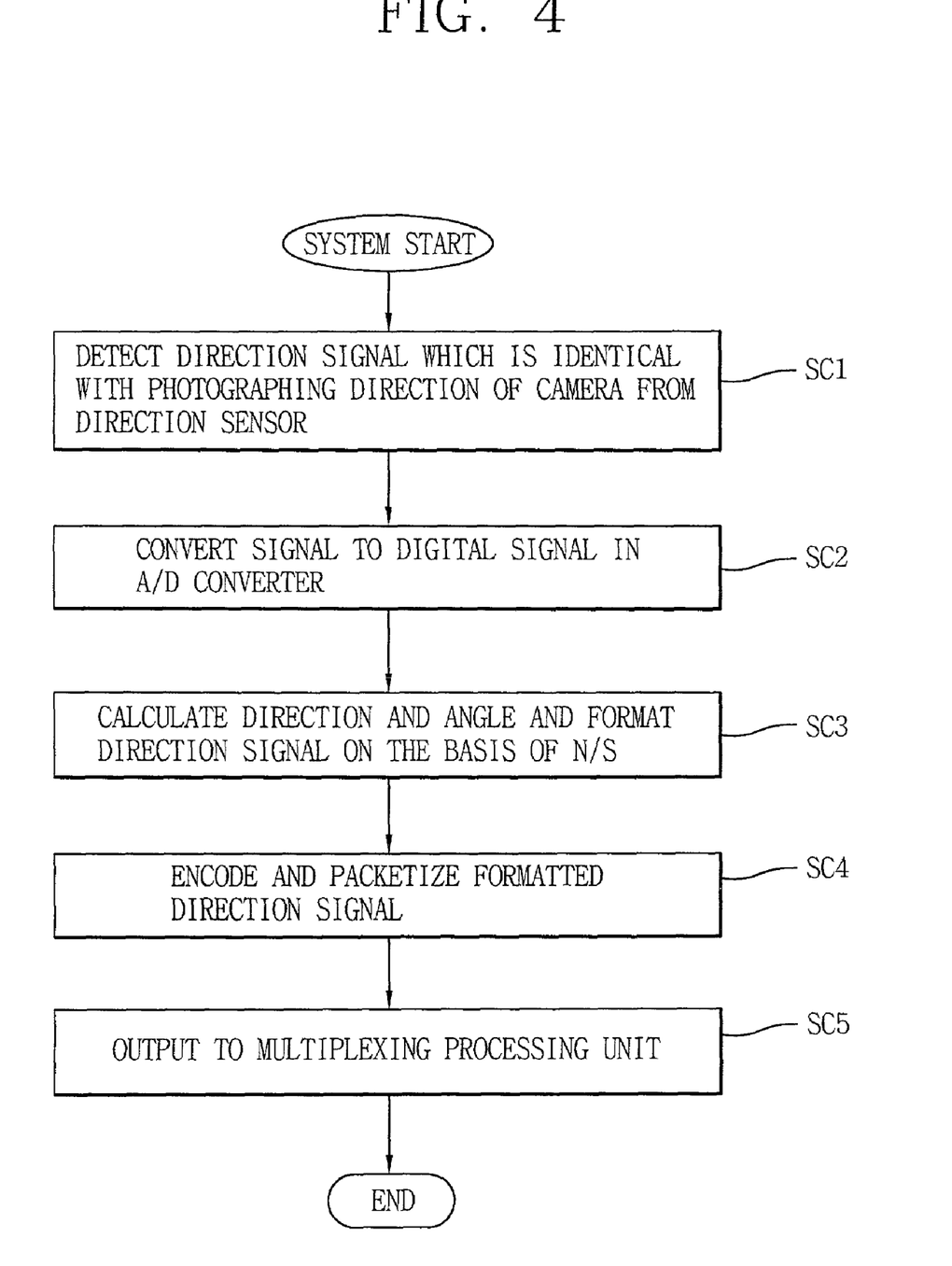
FIG. 4 is a flow chart showing a direction displaying encoding processing progress in accordance with the present invention.
Figure 5:
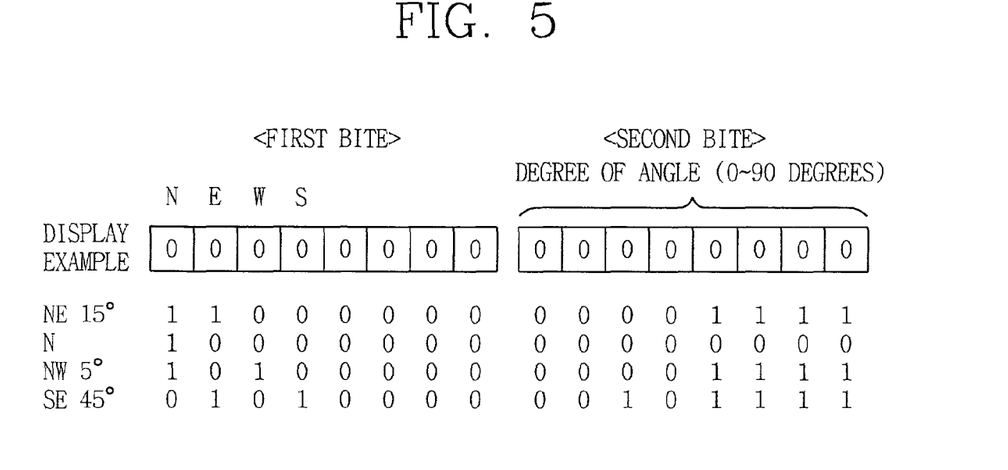
FIG. 5 is a format view showing direction displaying data in accordance with the present invention.

FIG. 4 is a flow chart showing a direction displaying processing unit 206 in accordance with the present invention.

The direction sensor 204 detects a direction signal having a same photographing direction of a camera 102A (SC1), the A/D converter 205 converts an analogue direction signal the detected analogue direction signal to a digital direction signal (SC2) and the direction displaying processing unit 206 formats direction and angle signals after calculating the direction and angle of the photographing object on the basis of direct north and south direction. The direction displaying processing unit 206 encodes, packetizes the formatted direction angle signals and outputs to the multiplexing processing unit (SC3, SC4 and SC5). The direction displaying processing unit 206 formats the direction signal read from the A/D converter 205.

For example, in case the direction of the photographing object is northern-east 15° (NE15), the direction signal is formatted in the form of "1100000 000001111", in case the direction of the photographing object is direct north (N), the direction signal is formatted in the form of "10000000 00000000", in case the direction of the photographing object is northern-west 15° (NW), the direction signal is formatted in the form of "10100000 00001111" and in case the direction of the photographing object is southern-east 45° (SE), the direction signal is formatted in the form of "01010000 00101101".

Figure 6A:
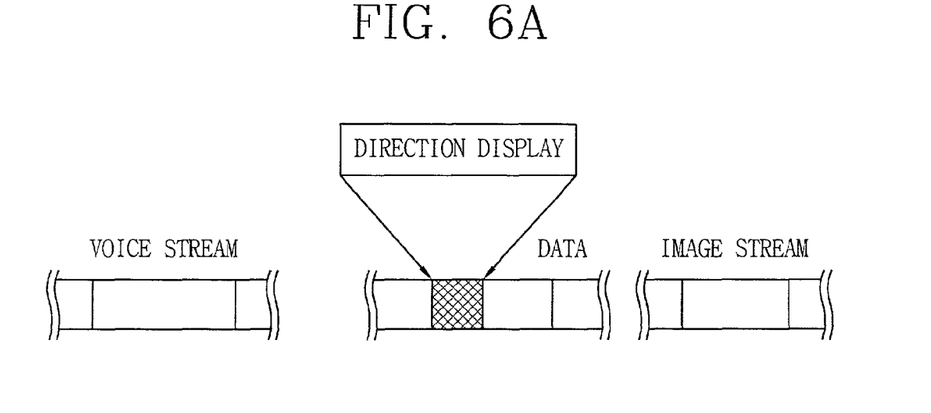
FIGS. 6A and 6B are format views illustrating direction displaying data in accordance with the present invention.
Figure 6B:
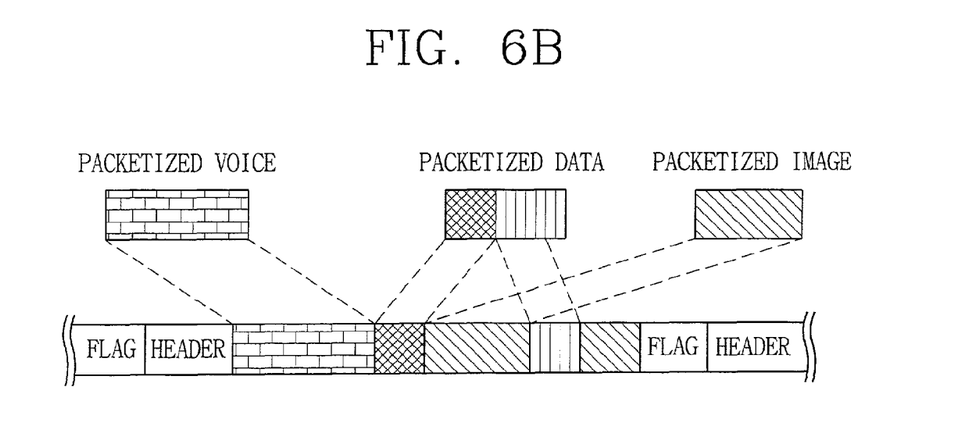

The multiplexing processing unit 104C multiplexes the voice/image/direction data generated in the above method in the form of FIGS. 6A and 6B and the multiplexed voice/image/direction data is transmitted to a radio-frequency transceiver unit 106 and then to the base station (not shown) through a base band apparatus 105.

Figure 7:
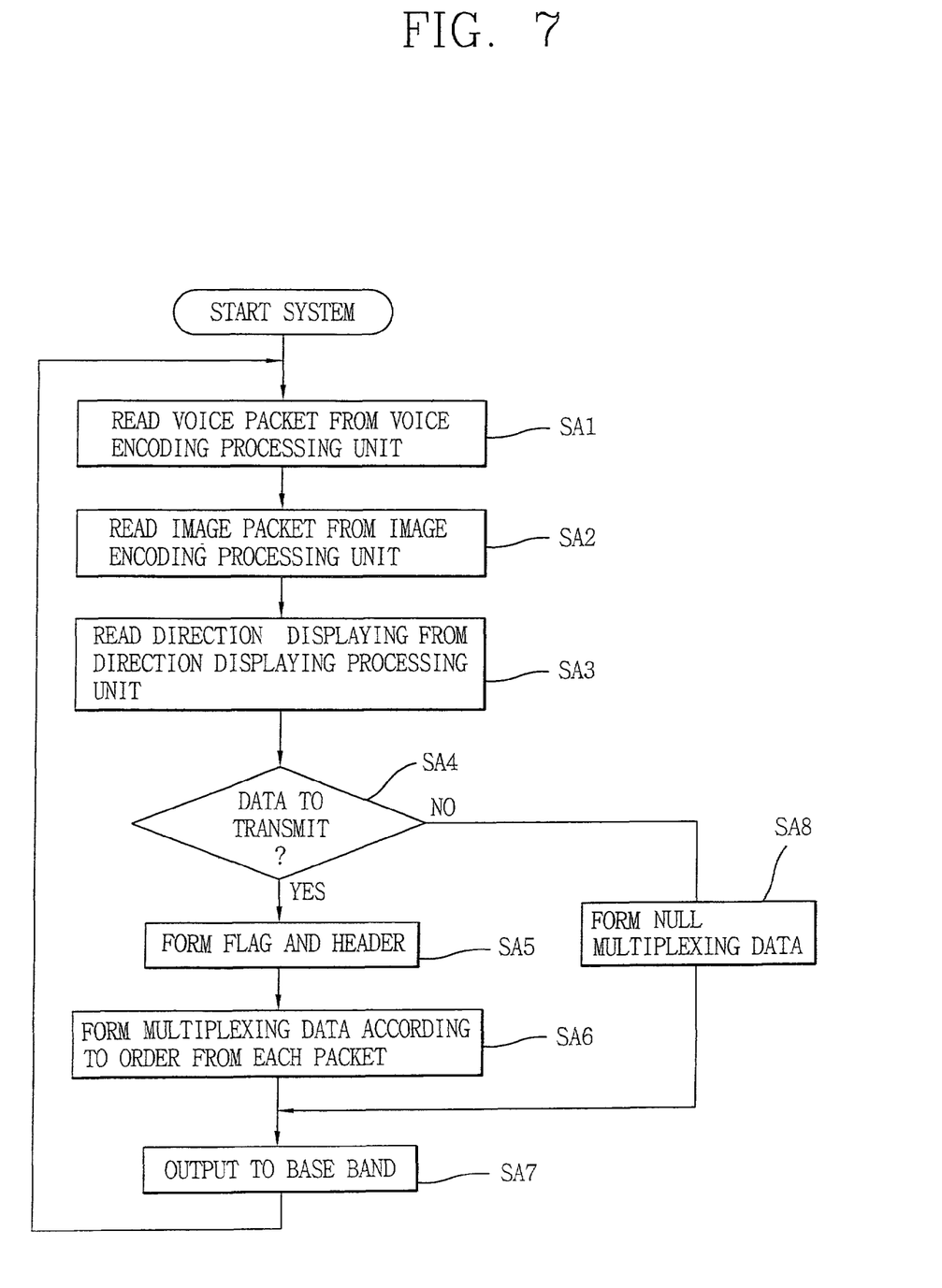
FIG. 7 is a signal flow chart of a transmitting processing process of the multiplexing processing unit in accordance with the present invention.

FIG. 7 is a signal flow chart of a transmitting processing process of the multiplexing processing unit 104C in accordance with the present invention.

As shown in FIG. 7, the multiplexing processing unit 104C reads voice packet data from a voice encoding processing unit 104A, reads image packet data from the image encoding processing unit 104B and reads direction packet data from the direction displaying processing unit 206 (SA1, SA2 and SA3). If data read from each processing unit, that is, data to be outputted to the base band apparatus (105) exist (SA4), the multiplexing processing unit 104C forms a flag and a header and then forms multiplex data in a certain order as in FIG. 6B to output respective packet data read from the respective processing units (104A, 104B and 206) to the base band apparatus 105 (SA5 and SA6). If it is confirmed that there is no data to be outputted to the base band apparatus 105, the multiplexing processing unit form null multiplexing data (SA8). If the multiplexing data is formed, the formed data are outputted to the base band apparatus 105 (SA7).

On the other hand, the data received from the radio-frequency transceiver unit 106 are processed in the reverse direction by the respective processing unit through the base band apparatus 105 and outputted to a speaker 101B or LCD 103A. Namely, as in FIGS. 6A and 6B, after the multiplexing data are separated to voice/image/direction packets respectively, the packets are supplied to the voice encoding processing unit 104A, image encoding processing unit 104B and direction encoding processing unit 206 and restored to an original digital data.

Figure 8:
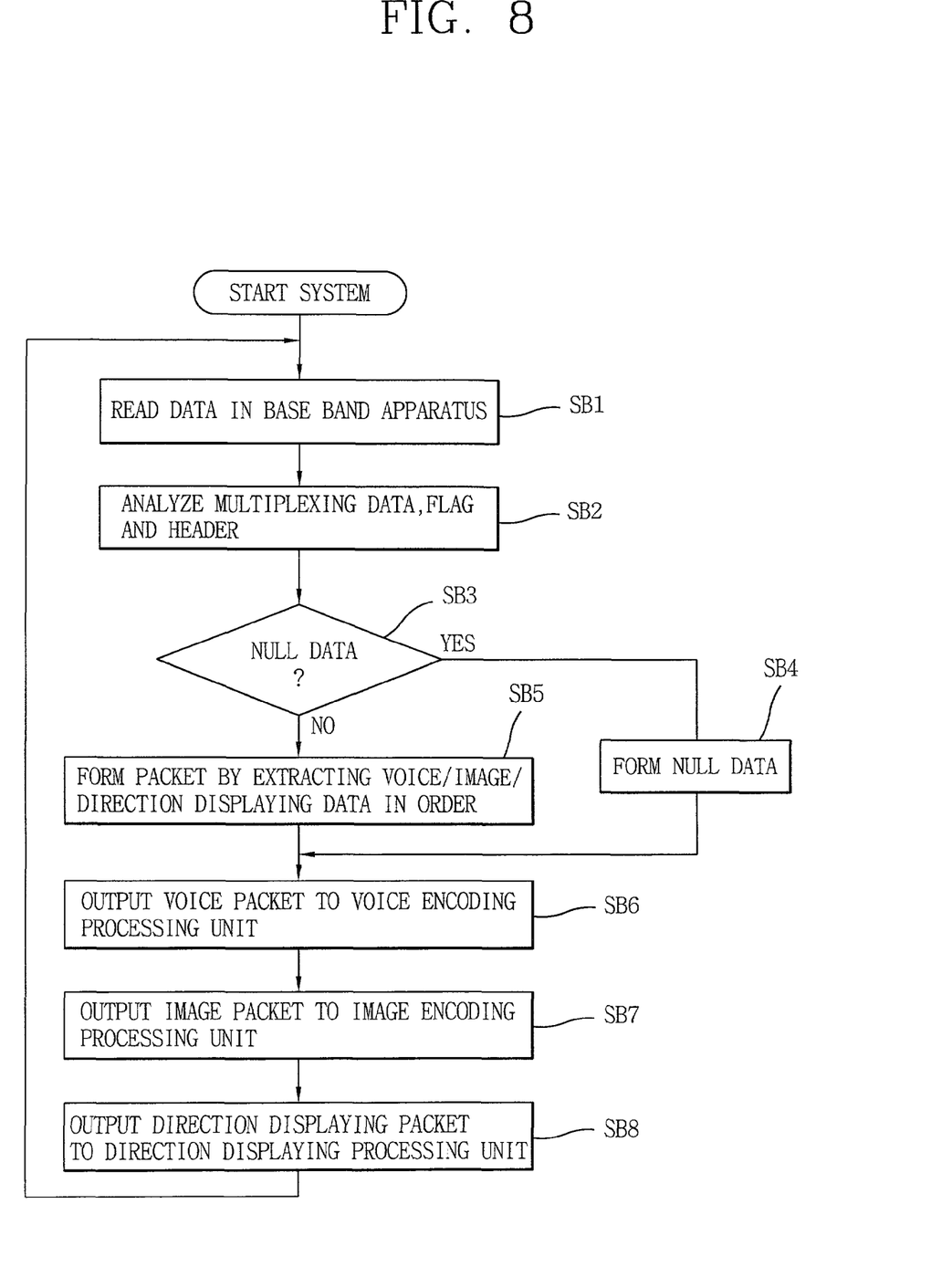
FIG. 8 is a signal flow chart of a receiving processing process of the multiplexing processing unit in accordance with the present invention.

FIG. 8 is a signal flow chart of a receiving processing process in the multiplexing processing unit in accordance with the present invention.

As shown in FIG. 8, the multiplexing processing unit 104C reads data multiplexed from the base band apparatus 105 and analyzes respective data, flag and header. As the result of the analysis, if the data are normal, the read multiplexing data is demultiplexed and the voice/image/direction packet data are separated-detected (SB1, SB2 and SB5). If the data are null data, the multiplexing processing unit forms null data in a certain form (SB4).

Later, the separated-detected voice packet data is outputted to the voice encoding processing unit 104A (SB6), the image packet data are outputted to the image encoding processing unit 104B (SB7) and the direction displaying packet data are outputted to the direction displaying processing unit 206 (SB8). The digital data decoded in the image encoding processing unit 104B are synthesized with the direction data outputted in the direction displaying processing unit 206 and displayed on the LCD 103A through the LCD module 103.

Figure 9:
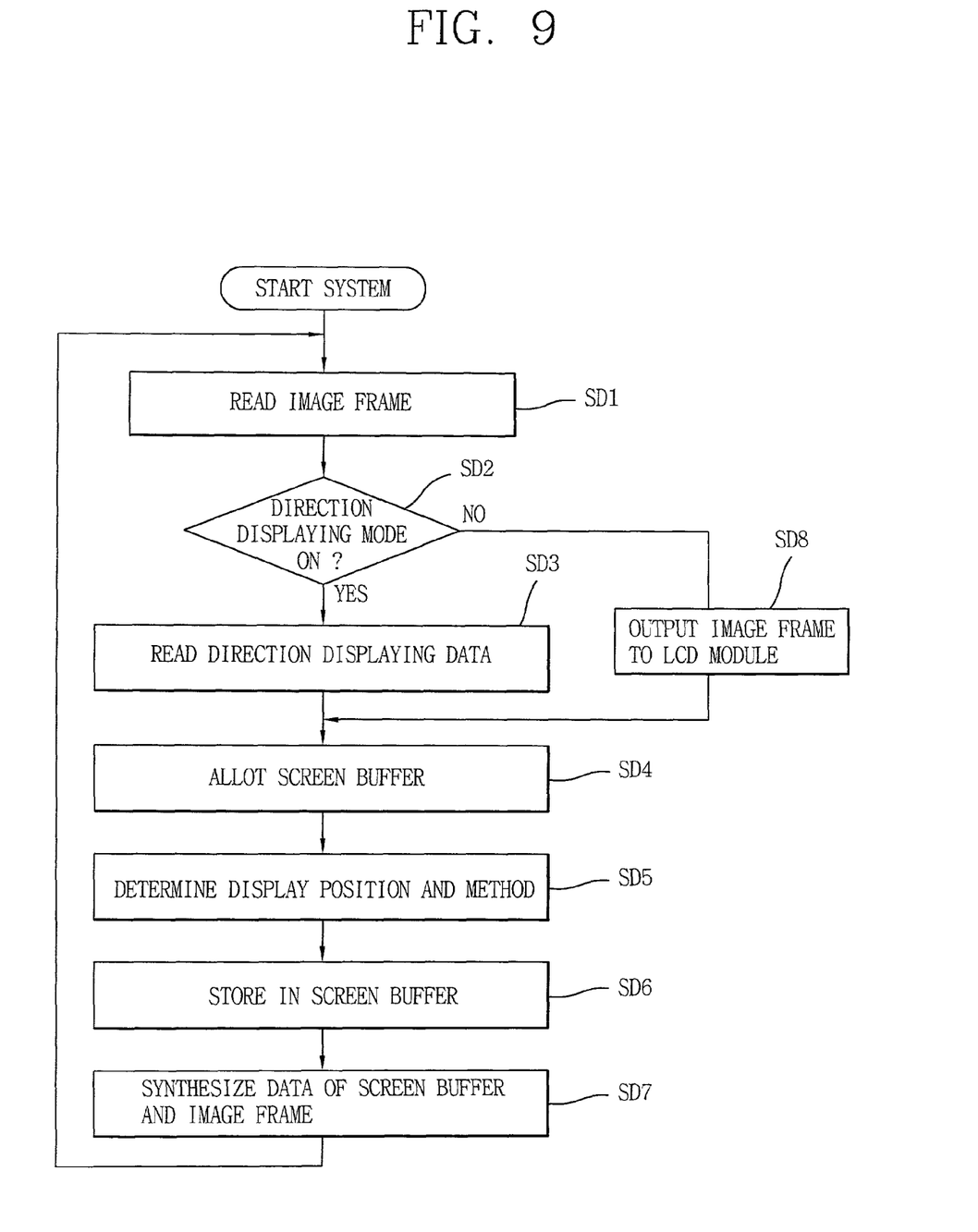
FIG. 9 is a signal flow chart of a processing process for displaying direction on a screen in accordance with the present invention.

The processing process of the voice/image communication apparatus of the terminal in accordance with the present invention for displaying direction on the screen will be described in detail with reference to FIG. 9.

Figure 10:
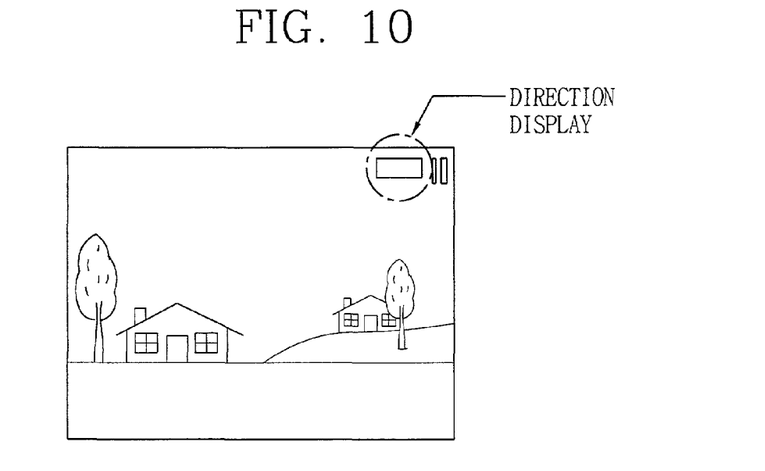
FIG. 10 is an exemplary view showing direction display on the screen in accordance with the present invention.

The voice/image communication apparatus 104 reads the image frame and checks whether the direction displaying mode is set currently (SD1 and SD2). The voice/image communication apparatus 104 outputs only read image frames on the LCD module 103 if the direction displaying mode is not set (SD8). However, the voice/image communication apparatus 104 allots screen buffers for storing the read direction displaying data and then determines the display position and method on the screen if it is confirmed that the direction displaying mode is currently set (SD3, SD4 and SD5). Later, the direction displaying processing unit 206 stores the above processed direction displaying data in the screen buffer and the stored direction displaying data and the image frame are synthesized by a certain logical arithmetic process and displayed on the LCD 103A through the LCD module 103 as in FIG. 10. At this time, the display position of the direction displaying data can be adjusted by necessity properly and the data can be displayed at the upper end at the right side as in FIG. 10.

Figure 11A:
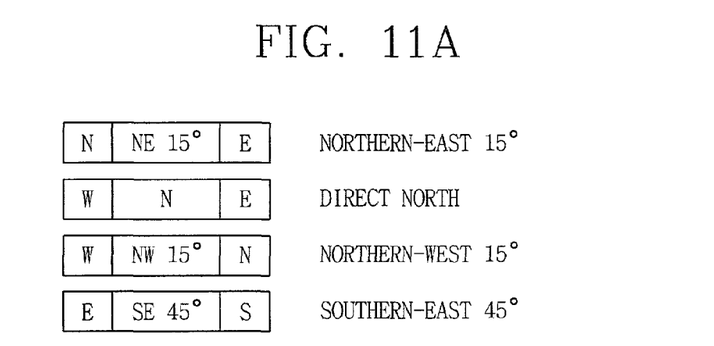
FIGS. 11A and 11B are exemplary views showing an embodiment of direction display in accordance with the present invention.
Figure 11B:
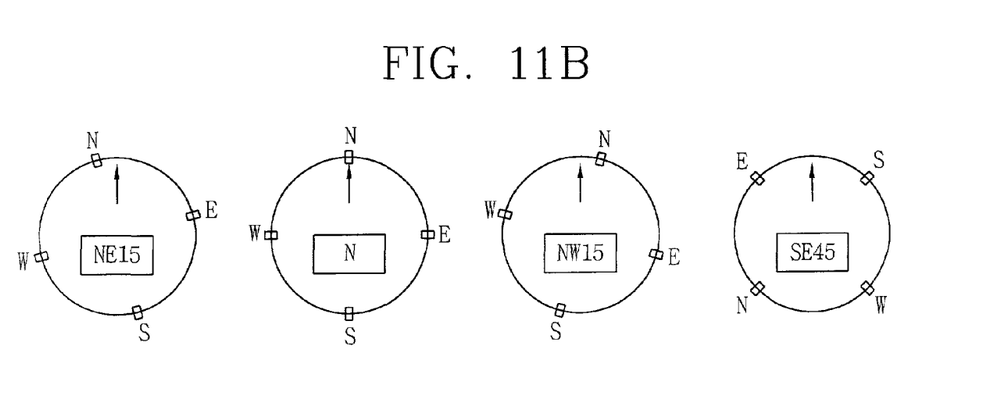

Also, the method of displaying the direction displaying data can be set in the form of on-screen as in FIG. 11A or a compass shown in FIG. 11B.

Figure 12:
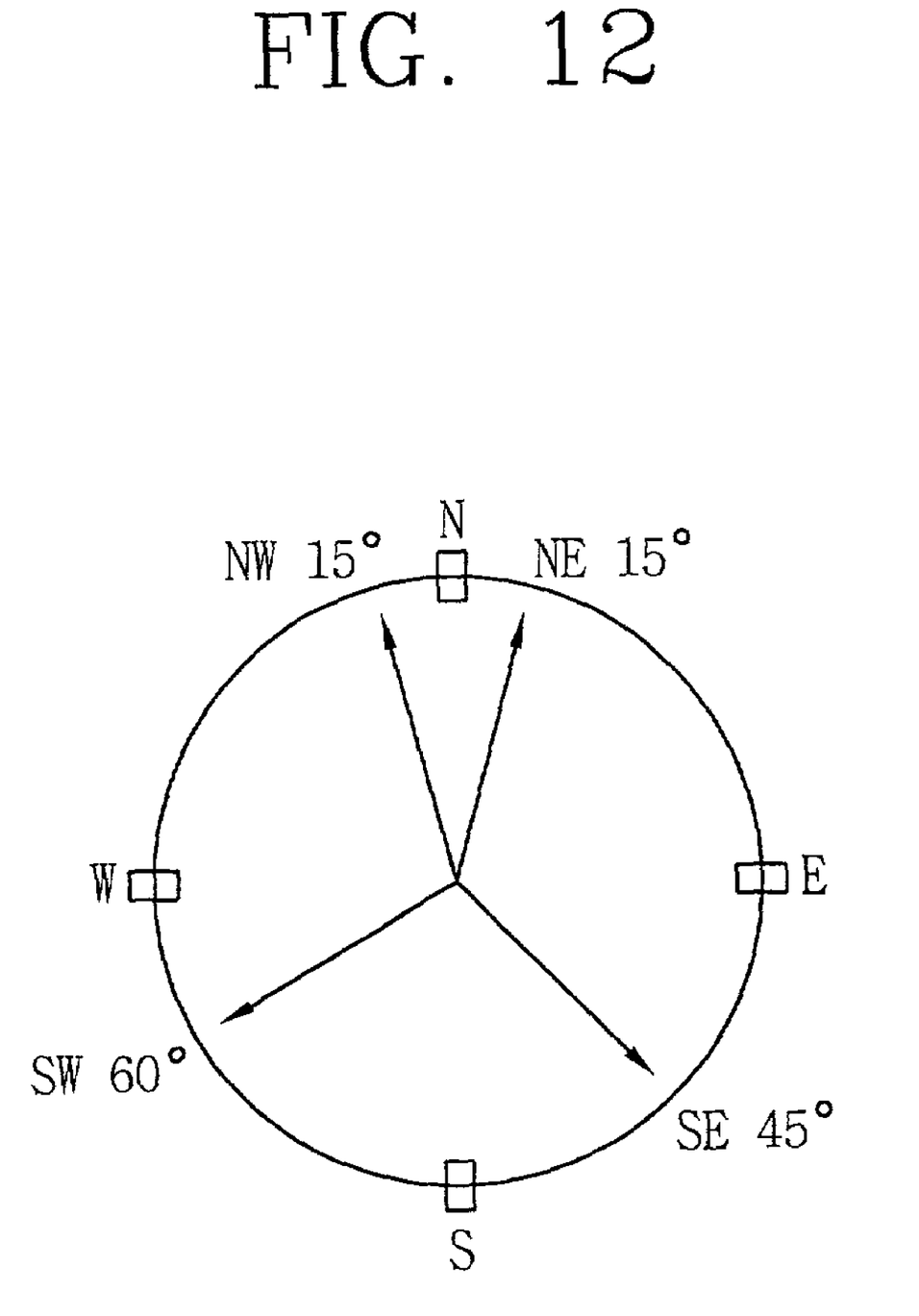
FIG. 12 illustrates direction display in accordance with the present invention.

For example, in case of showing the direction displaying data in the form of compass, as shown in FIG. 12, the direction display is performed on the basis of direct north and south directions. Namely, the direction displaying displays 15° from the direct north to the east as NE 15°, 15° from the direct north to the west as NW 15°, 45° from the direct south to the east as SE 45° and 60° from the direct south to the west as SW 60°.

As described above, the present invention has an advantage that the efficiency value of image information is maximized by displaying the direction information together with the object when the photographed object is displayed through a camera installed in a terminal. Also, the present invention can utilize the multiplexing form including direction in an image as a basic data format of multimedia.

In the above description, moving image was an example but the present invention is not limited in the description. Namely, in case of stop image, identical efficiency can be also obtained.

Also, time and date information can be displayed by multiplexing identically with the above direction displaying method. However, the time information does not need any additional apparatus since it is provided in the terminal system basically.

In the description, in case of ITU-T recommendation, it was described with a recommendation used in GSTN as an example but the ITU-T recommendation of the present invention can be adapted to another ITU-T recommendation or methods of an identical object.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A mobile terminal, comprising:
   a codec configured to perform a converting operation between analog voice data and digital voice data;
   a camera module connected to a camera installed within the mobile terminal, the camera module configured to perform a converting operation between analog image data and digital image data;
   a direction sensor configured to detect direction data associated with an image located in a photographing direction of the camera, wherein the direction data is formatted in only two consecutive bytes, wherein a first byte of the only two consecutive bytes is configured to provide compass heading information of the image, wherein a first bit, a second bit, a third bit and a fourth bit of the first byte, when active, are configured to indicate north, east, west and south, respectively, and wherein at most two of the first bit, the second bit, the third bit or the fourth bit of the first byte are set active so as to denote the compass heading information of the image, and wherein a second byte of the only two consecutive bytes is configured to provide compass bearing information, the compass bearing information comprising at least an angle between directions represented by the at most two of the first bit, the second bit, the third bit or the fourth bit of the first byte;
   a voice/image communication apparatus configured to multiplex or demultiplex the direction data, the voice data and the image data;
   a display module configured to simultaneously display the image based on the image data and the direction data from the voice/image communication apparatus, wherein the direction data is displayed on the image to indicate the compass heading information and the compass bearing information associated with the image;
   a speaker configured to output the voice data demultiplexed by the voice/image communication apparatus; and
   a control unit configured to control the codec, the camera module, the voice/image communication apparatus, and the display module, wherein the control unit checks whether a direction displaying mode has been selected and controls the display module to display the image data and the direction data simultaneously as a single image when the direction displaying mode is selected.

2. The mobile terminal of claim 1, wherein the voice/image communication apparatus comprises:
   a multiplexing processing unit configured to multiplex or demultiplex direction data and at least one of converted voice or image data to display multiplexed image and direction data on the display module;
   a voice encoding processing unit configured to encode voice data input from the codec or convert voice data transmitted from the multiplexing processing unit into data for transmitting to a speaker;
   an image encoding processing unit configured to encode image data input from the camera module or convert image data transmitted from the multiplexing processing unit into data for displaying on the display module; and
   a direction displaying processing unit configured to encode direction data input from the A/D converter or convert direction data transmitted from the multiplexing processing unit into data for displaying on the display module.

3. The mobile terminal of claim 2, wherein the direction displaying processing unit calculates a compass orientation direction and encodes the calculated compass orientation direction by formatting the calculated compass orientation direction into a binary value.

4. The mobile terminal of claim 2, wherein the direction displaying processing unit displays the direction data in a direction displaying area at one side of a screen of the display module.

5. The mobile terminal of claim 2, wherein the direction displaying processing unit displays the direction data as a direction on a screen of the display module.

6. The mobile terminal of claim 2, wherein the direction displaying processing unit displays the direction data as a direction on a screen of the display module in the form of a compass.

7. The mobile terminal of claim 2, wherein the multiplexing processing unit multiplexes encoded packet data by receiving the data from the voice encoding processing unit, image encoding processing unit, and direction displaying processing unit, and inputs the data to an image frame by forming a flag and header to distinguish the image frame.

8. The mobile terminal of claim 2, wherein the multiplexing processing unit is further configured to form a null data set if no data is transmitted thereto.

9. The mobile terminal of claim 1, further comprising a transceiver configured to transmit and receive multiplexed data to and from an external device.

10. The mobile terminal of claim 1, wherein the control unit is configured to synthesize the demultiplexed image data and direction data.

11. The mobile terminal of claim 1, wherein the image data comprises a moving picture.

12. The mobile terminal of claim 1, wherein the voice/image communication apparatus receives direction data, voice data and image data in a packetized format, wherein a first portion of the packetized direction data is provided between the packetized voice data and the packetized image data, and a second portion of the packetized direction data is provided between first and second portions of the packetized image data.

13. A method for displaying image data and direction data of an object being photographed on a screen of a mobile terminal, the method comprising:
receiving data at a receiving unit of the mobile terminal, the image data being associated with the object;
demultiplexing, at a demultiplexing unit of the mobile terminal, the data into image data, voice data and compass orientation direction data, wherein the direction data is formatted in only two consecutive bytes, wherein a first byte of the only two consecutive bytes is configured to provide compass heading information of the image, wherein a first bit, a second bit, a third bit and a fourth bit of the first byte, when active, are configured to indicate north, east, west and south, respectively, and wherein at most two of the first bit, the second bit, the third bit or the fourth bit of the first byte are set active so as to denote the compass heading information of the image, and wherein a second byte of the only two consecutive bytes is configured to provide compass bearing information, the compass bearing information comprising at least an angle between directions represented by the at most two of the first bit, the second bit, the third bit or the fourth bit of the first byte;
checking, at a checking unit of the mobile terminal, the demultiplexed data to determine a setting of a direction displaying mode; and
displaying the image and the direction data simultaneously as a single image on the screen of the mobile if the direction displaying mode is set.

14. The method of claim 13, wherein a multiplexing processing unit checks the received image data and forms a null data set if the image data is not separable.

15. The method of claim 13, wherein displaying separated image and compass orientation direction data further comprises detecting the demultiplexed image data and compass orientation direction data and transmitting said detected data to an image encoding processing unit and the direction displaying processing unit, respectively.

16. The method of claim 13, wherein image data read from a voice/image communication apparatus is displayed on the screen of the mobile terminal if the direction displaying mode is not set in the direction displaying processing unit.

17. The method of claim 13, wherein the direction displaying processing unit displays the compass orientation direction data in a direction displaying area at one side of the screen of the mobile terminal.

18. The method of claim 13, wherein the direction displaying processing unit displays the compass orientation direction data as a direction on the screen of the mobile terminal.

19. The method of claim 13, wherein the direction displaying processing unit displays the compass orientation direction data as a direction on the screen of the mobile terminal in the form of a compass.

20. The method of claim 13, wherein the displaying comprises a transmitted stop image.

21. The method of claim 13, further comprising displaying time and date information with the image and compass orientation direction data on the screen of the mobile terminal.

22. The method of claim 13, wherein receiving image data comprises receiving direction data, voice data and image data in a packetized format, wherein a first portion of the packetized direction data is provided between the packetized voice data and the packetized image data, and a second portion of the packetized direction data is provided between first and second portions of the packetized image data.

23. A mobile terminal, comprising:
a display;
a receiving unit configured to receive multiplexed data including image data and direction data associated with the image data, wherein the receiving unit receives the direction data, voice data and the image data in a packetized format, wherein the direction data is formatted in only two consecutive bytes, wherein a first byte of the only two consecutive bytes is configured to provide compass heading information of the image, wherein a first bit, a second bit, a third bit and a fourth bit of the first byte, when active, are configured to indicate north, east, west and south, respectively, and wherein at most two of the first bit, the second bit, the third bit or the fourth bit of the first byte are set active so as to denote the compass heading information of the image, and wherein a second byte of the only two consecutive bytes is configured to provide compass bearing information, the compass bearing information comprising at least an angle between directions represented by the at most two of the first bit, the second bit, the third bit or the fourth bit of the first byte;
a demultiplexing unit configured to demultiplex the multiplexed data into the image data and the direction data;
a checking unit configured to check whether a direction displaying mode is set; and
a controller configured to control the display so as to display the image data and the direction data simultaneously as a single image when the checking unit verifies that the direction display mode is set.

24. The mobile terminal of claim 23, wherein the demultiplexed image data and compass orientation direction data are synthesized by the controller and displayed on the display.

25. The mobile terminal of claim 24, wherein the image data comprises moving picture data.

26. The mobile terminal of claim 23, wherein the compass orientation direction data is formatted in two bytes, wherein the first byte provides compass heading information and the second byte provides compass bearing information.

27. A method of displaying direction information associated with an object being photographed by a camera phone on a screen of the camera phone, the method comprising:

collecting packetized direction data, packetized voice data, and packetized image data in the camera phone associated with the object being photographed, wherein a first portion of the packetized direction data is provided between the packetized voice data and the packetized image data, and a second portion of the packetized direction data is provided between the packetized image data;

demultiplexing the packetized direction data, the packetized voice data, and the packetized image data into direction data, voice data, and image data, respectively, wherein the direction data is formatted in only two consecutive bytes, wherein a first byte of the only two consecutive bytes is configured to provide compass heading information of the image, wherein a first bit, a second bit, a third bit and a fourth bit of the first byte, when active, are configured to indicate north, east, west and south, respectively, and wherein at most two of the first bit, the second bit, the third bit or the fourth bit of the first byte are set active so as to denote the compass heading information of the image, and wherein a second byte of the only two consecutive bytes is configured to provide compass bearing information, the compass bearing information comprising at least an angle between directions represented by the at most two of the first bit, the second bit, the third bit or the fourth bit of the first byte;

displaying a representation of the object being photographed on the screen of the camera phone based on the image data; and displaying the direction data of the object being photographed on the screen of the camera phone, superimposed on the representation of the object being photographed displayed on the screen such that the image data and the direction data are displayed together as a single image.

28. The method of claim 27, wherein collecting data related to an object being photographed comprises collecting compass orientation direction data formatted in two bytes, wherein the first byte provides compass heading information and the second byte provides compass bearing information.

* * * * *